United States Patent
Mutai et al.

(10) Patent No.: US 6,951,424 B2
(45) Date of Patent: Oct. 4, 2005

(54) MOTOR WITH AXIALLY MOVEABLE BEARING MEMBER

(75) Inventors: Hitoshi Mutai, Nagano (JP); Kenichi Hoshina, Nagano (JP)

(73) Assignee: Sankyo Seiki MFG. Co. Ltd., Nagano (JP)

( * ) Notice: Subject to any disclaimer, the term of this patent is extended or adjusted under 35 U.S.C. 154(b) by 193 days.

(21) Appl. No.: 10/426,898

(22) Filed: Apr. 29, 2003

(65) Prior Publication Data

US 2003/0228079 A1 Dec. 11, 2003

(30) Foreign Application Priority Data

Apr. 30, 2002 (JP) ........................................ 2002-129213

(51) Int. Cl.$^7$ .............................................. F16C 19/10
(52) U.S. Cl. ........................ 384/610; 384/245; 384/902
(58) Field of Search ................................ 384/610, 245, 384/902, 910; 310/90; 74/425

(56) References Cited

U.S. PATENT DOCUMENTS

| | | | | | |
|---|---|---|---|---|---|
| 5,144,738 | A | * | 9/1992 | Oyafuso | ...................... 310/90 |
| 5,212,999 | A | * | 5/1993 | Kitada | ........................ 384/245 |
| 5,213,000 | A | * | 5/1993 | Saya et al. | ..................... 74/425 |
| 5,777,413 | A | * | 7/1998 | Nagata et al. | ................ 310/90 |
| 5,886,438 | A | * | 3/1999 | Kawanishi | .................... 310/90 |

* cited by examiner

Primary Examiner—Thomas R. Hannon
(74) Attorney, Agent, or Firm—Hogan and Hartson, LLP

(57) ABSTRACT

A motor includes a rotor section with a rotor shaft having an end section, and a stator section including a yoke section disposed opposite the rotor section. The motor is also equipped with a bearing assembly having a bearing member that includes a main bearing section with a recess section and a ball bearing received in the recess section wherein the ball bearing rotatably support the end section of the rotor shaft, and a bearing holder defining a center through hole that slidably holds the main bearing section of the bearing member in the axial direction, wherein the bearing holder is formed from a sintered compact member.

24 Claims, 6 Drawing Sheets

MOTOR WITH AXIALLY MOVEABLE BEARING MEMBER

BACKGROUND OF THE INVENTION

1. Field of the Invention

The present invention relates to a motor equipped with a bearing member mounted on a bearing holder, wherein the bearing member is moveable in an axial direction and immovable in a radial direction.

2. Related Background Art

A motor may be provided with a rotor shaft that is rotatable with a rotor unit in an unitary fashion, wherein end sections of the rotor shaft are rotatably supported by appropriate bearing members. For example, FIG. 5 shows a permanent magnet type (PM type) stepping motor of the type described above. The stepping motor includes a stator unit with a core assembly 3 having a plurality of coils 2 that are wound in a generally cylindrical shape about a rotor shaft 1. The coils 2 are disposed adjacent to each other along an axial direction to form a plurality of phases. A rotor section 4 is mounted on the rotor shaft 1 in a center side section of the core assembly 3 in a manner that the rotor section 4 is located in close proximity to yokes 5 of the core assembly 3 in the radial direction. The rotor shaft 1 has a base end section (a right end section in the figure) that is rotatably supported by a pivot bearing member 6. Further, a lead screw 7 is formed on an output side (a left side in the figure) of the rotor shaft 1 in a unitary fashion. An end section (a left end section in the figure) of the lead screw 7 is also rotatably supported by a bearing member (omitted from the drawings).

The pivot bearing member 6 is equipped with a main body section 6a in a cylindrical shape. The main body section 6a of the pivot bearing member 6 is supported by a bearing holder 8 in a manner that the main body section 6a is moveable in the axial direction but held immovable in the radial direction. The bearing holder 8 has a mounting hole 8a, which is a through hole extending through the bearing holder 8, provided generally in a central section of the bearing holder 8, as shown in FIG. 6. The main body section 6a of the pivot bearing member 6 is inserted in the mounting hole 8a of the bearing holder 8. The main body section 6a of the pivot bearing member 6 is mounted on the bearing holder 8 in a manner moveable in the axial direction in order to assemble the pivot bearing member 6 in close contact with the rotary shaft 6, such that the rotary shaft 1 is highly accurately supported without looseness. The structure that moveably supports the main body section 6a in the axial direction is described in greater detail below.

The bearing holder 8 and the pivot bearing member 6 are retained in place by a flexible supporting member 9 that is made of a plate-shaped flexible spring member as shown in FIG. 7, for example. The flexible supporting member 9 is attached to a housing member of the stator section in a manner to cover the bearing holder 8 from a rear end side (a right end side in FIG. 5) of the housing member of the stator section. In particular, when the bearing holder 8 is formed from a resin material, the bearing holder 8 with the pivot bearing member 6 may be held by a fixing structure in which the bearing holder 8 with the pivot bearing member 6 is sandwiched between the yoke 5 of the stator section and the flexible supporting member 9.

More specifically, the flexible supporting member 9 is provided with four mounting sections 9a in the form of hooks provided at four side sections of the flexible supporting member 9, respectively. The mounting sections 9a pass side sections of the bearing holder 8 and engage sections of the yoke 5 of the stator section, respectively. As a result, the bearing holder 8 made of a resin member is held and affixed between the flexible supporting member 9 and the yoke 5.

Furthermore, a section of the flexible supporting member 9 is cut out in the flexible supporting member 9 and bent to form a force-application spring section 9b. The force-application spring section 9b is provided generally in a central section of the flexible supporting member 9 at a location where the force-application spring section 9b abuts against a rear end face of the main body section 6a of the pivot bearing member 6. The force-application spring section 9b applies a pressing force to the pivot bearing member 6 in the axial direction. By the axial pressing force caused by the force-application spring section 9b, the entire pivot bearing member 6 is pressed toward the rear end surface of the rotary shaft 1. As a result, the pivot bearing member 6 is positioned in the axial direction.

However, when the bearing holder 8 is formed from a resin member, an inner wall surface of the mounting hole 8a for receiving the pivot bearing member 6 may not always be finished with a high precision due to various factors such as shrinkage of the resin member when forming the bearing holder 8 with resin. Also, the mounting hole 8a may not be finished with a true circle in its cross section. As a result, the precision in positioning the pivot bearing member 6 in the radial direction may possibly lower, and the main body section 6a of the pivot bearing member 6 may not move smoothly even though the axial direction pressing force is applied by the flexible supporting member 9. As a consequence, the pivot bearing member 6 may not be highly accurately positioned in the axial direction. The lowered mounting precision of the pivot bearing member 6 not only results in generation of motor noise but also results in a larger fixing structure for retaining the bearing holder 8, which poses a difficulty in miniaturization of the motor.

To cope with the problems described above, some motors that have been developed have a structure in which the bearing holder 8 is formed from a pressed (forged) steel plate, as shown in FIG. 8, and the bearing holder 8 is affixed to portions of the yoke 5 of the stator section by welding. However, even when the steel bearing holder 8 is used. The mounting hole 8a may have problems in finishing precision in the surface condition, such as, for example, burrs that remain on its inner wall surface. Accordingly, like the bearing holder that is formed from a resin member described above, the steel bearing holder 8 has problems in that, for example, the main body section 6a of the pivot bearing member 6 does not move smoothly.

SUMMARY OF THE INVENTION

The present invention relates to a motor in which its bearing holder for retaining a bearing member can be readily and high accurately formed, and a fixing structure for retaining the bearing holder can be miniaturized.

The present invention also relates to a bearing assembly for a motor wherein the bearing assembly includes a bearing member and a bearing holder for slidably holding the bearing member in an axial direction.

In accordance with an embodiment of the present invention, a motor has a bearing member and a bearing holder that retains the bearing member, wherein the bearing holder is formed from a sintered compact member. Because the bearing holder is formed from a sintered compact member, the bearing holder that may have a complex structure can be readily and highly accurately formed. In particular, because the bearing holder is formed from a sintered compact member, a mounting hole provided in the bearing holder for retaining the bearing member has a highly accurate inner circumferential wall surface, such that the bearing member retained by the bearing holder can be maintained in a good sliding state, and the bearing member can be readily and highly accurately positioned in the axial direction.

Moreover, since the bearing holder is formed from a sintered compact member, the bearing holder may be affixed in position by welding. For example, in a motor having a rotor section and a stator section that is disposed opposite the rotor section, the bearing holder may be affixed to a yoke of the stator section by welding. This simplifies the fixing structure of the bearing holder, and reduces the overall size of the motor.

In accordance with another embodiment of the present invention, the bearing holder is provided with a flexible supporting member that applies a pressing force in the axial direction to the bearing member for restricting the position of the bearing member. The flexible supporting member may include a pair of mounting sections provided at two sides thereof that oppose each other across a diameter of the motor in a first direction to engage the bearing holder, and a pair of reinforcing flange sections at opposing sides of the flexible supporting member in a second direction generally perpendicular to the first direction. The reinforcing flange sections may be formed by bending end portions the flexible supporting member along the opposing sides thereof such that the bent opposing end portions sandwich two end sections of the bearing holder.

As a result, the rigidity of the flexible supporting member can be maintained and the number of mounting sections can be reduced. Accordingly, the flexible supporting member can be reduced in size, and the bearing holder can also be reduced in size.

In accordance with another embodiment of the present invention, a separation between the two end sections of the bearing holder that are sandwiched by the two end portions of the flexible supporting member is formed shorter than a separation between the two opposing sides of the bearing holder at which the pair of mounting sections of the flexible supporting member are mounted. Accordingly, the bearing holder can be reduced in size by an amount of the portion reduced in length in one direction.

Other features and advantages of the invention will be apparent from the following detailed description, taken in conjunction with the accompanying drawings that illustrate, by way of example, various features of embodiments of the invention.

PREFERRED EMBODIMENTS

A PM type stepping motor in accordance with an embodiment of the present invention will be described in detail below with reference to the accompanying drawings.

Figure 1:
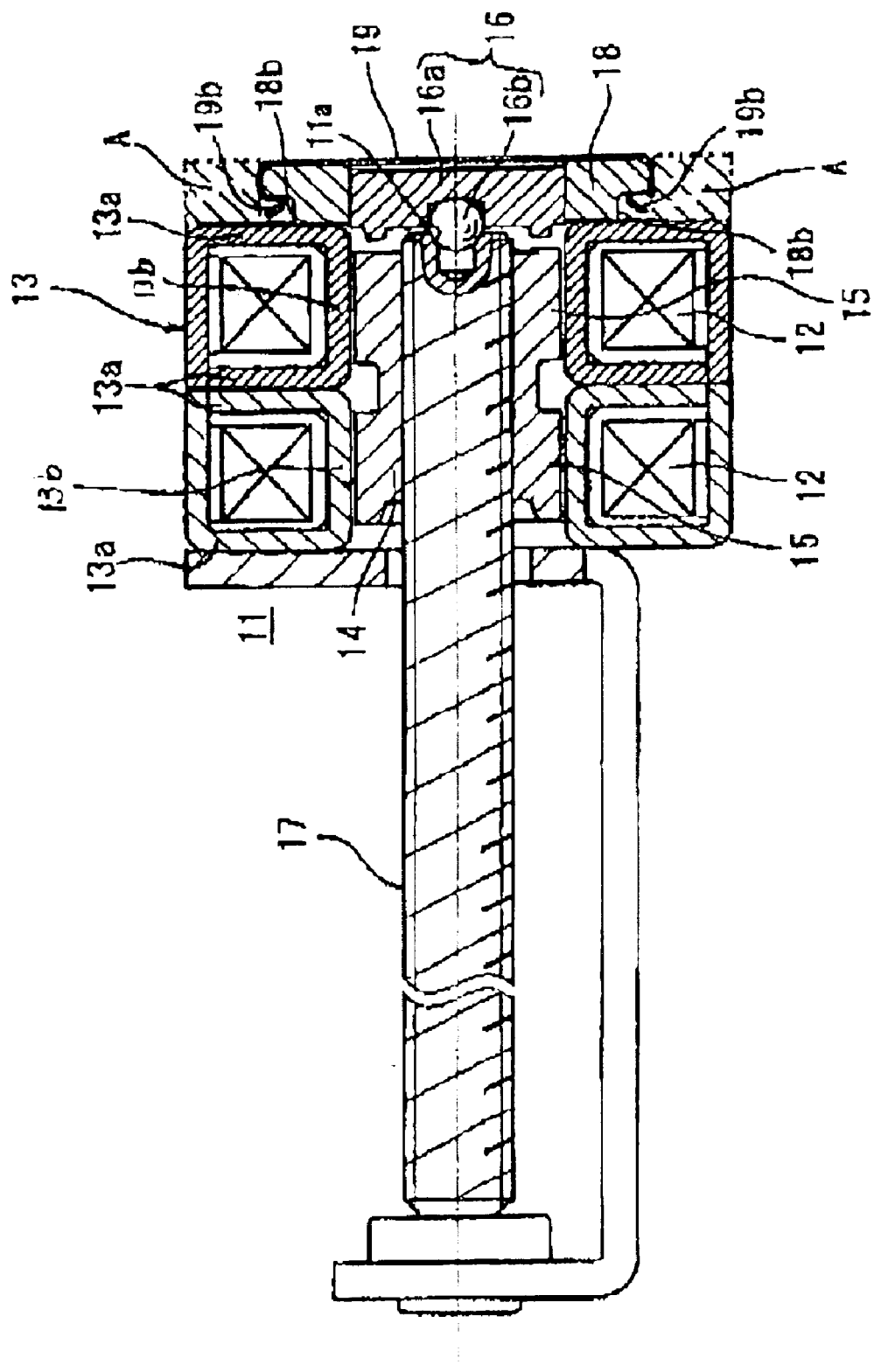
FIG. 1 is a cross-sectional view of a structure of a PM type stepping motor in accordance with one embodiment of the present invention.

A PM type stepping motor shown in FIG. 1 includes a stator unit with a core assembly 13 having a plurality of coils 12 that are wound in a generally cylindrical shape about a rotor shaft 11. The coils 12 are disposed adjacent to each other along an axial direction to form a plurality of phases. A rotor section 14 is mounted on the rotor shaft 11 in a center side section of the core assembly 13. A rotor magnet 15 is circularly mounted on an outer circumferential surface of the rotor 14. The rotor magnet 15 is disposed in close proximity to the core assembly 13 in the radial direction.

The core assembly 13 is provided with retaining yokes 13a that are disposed to sandwich the coils 12 in the axial direction. Plural pole teeth 13b extend in the axial direction from inner end edges of the retaining yokes 13a that form a pair to opposing end edges thereof. The pole teeth 13b extend generally at right angle with respect to a direction in which the retaining yokes 13a extend. The plural pole teeth 13b on one of the retaining yokes 13a in pair extend to an area adjacent to the other retaining yoke 13a, such that the plural pole teeth 13b are circularly arranged about the rotor shaft 12 as a center.

The rotor shaft 11 has a base end section (a right end section in the figure) that is freely, rotatably supported by a pivot bearing member 16. Further, a lead screw 17 is formed on an output side (a left side in the figure) of the rotor shaft 1 in a unitary fashion. An end section (a left end section in the figure) of the lead screw 17 is also freely, rotatably supported by a bearing member (omitted from the drawings).

The pivot bearing member 16 is equipped with a main body section 16a. A ball 16b is freely rotatably mounted on the main body section 16a. The ball 16b is received in a freely rotatable manner in a bearing surface 11a that is formed in the form of a concave recess in an end surface of the rotary shaft 11 on the right hand side in the figure. The ball 16b is received in the bearing surface 11a under pressure such that the rotor shaft 11 is freely, rotatably supported in the thrust direction and the radial direction.

Figure 2:
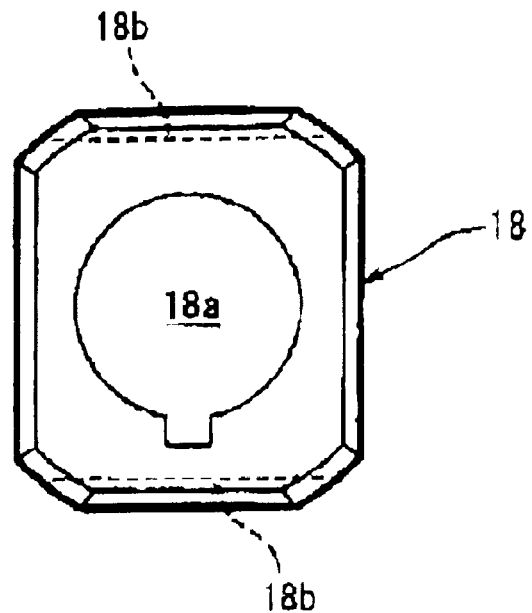
FIG. 2 is a front view of a bearing holder in one example that is mounted on the PM type stepping motor indicated in FIG. 1.

The main body section 16a of the pivot bearing member 16 may preferably be formed from a resin member in a generally cylindrical form. The main body section 16a of the pivot bearing member 16 is supported by a bearing holder 18 that may be in a plate shape. The bearing holder 18 may have a generally rectangular cross section as viewed in the axial direction, as indicated in FIG. 2. In the illustrated embodiment, a distance between one opposing ends of the rectangular cross section of the bearing holder 18 is shorter than a distance between the other opposing ends of the rectangular cross section of the bearing holder 18. In another embodiment, the bearing holder 18 may have a generally square cross section as viewed in the axial direction (not shown), a generally circular cross section with four straight edges (not shown). The bearing holder 18 has a mounting hole 18a, which is a through hole extending through the bearing holder 18, provided generally in a central section of the bearing holder 18, as shown in FIG. 2. The main body section 16a of the pivot bearing member 16 is inserted in the mounting hole 18a of the bearing holder 18. As a result, the main body section 16a of the pivot bearing member 16 is held immovable in the radial direction but moveable in the axial direction.

The bearing holder 18 may preferably be formed from a sintered compact member that is formed by sintering appropriate metal powders as raw material into a compact. Also, the bearing holder 18 may preferably be affixed to a rear end side (a right end side in FIG. 1) of the retaining yokes 13a of the stator section by welding.

Figure 3:
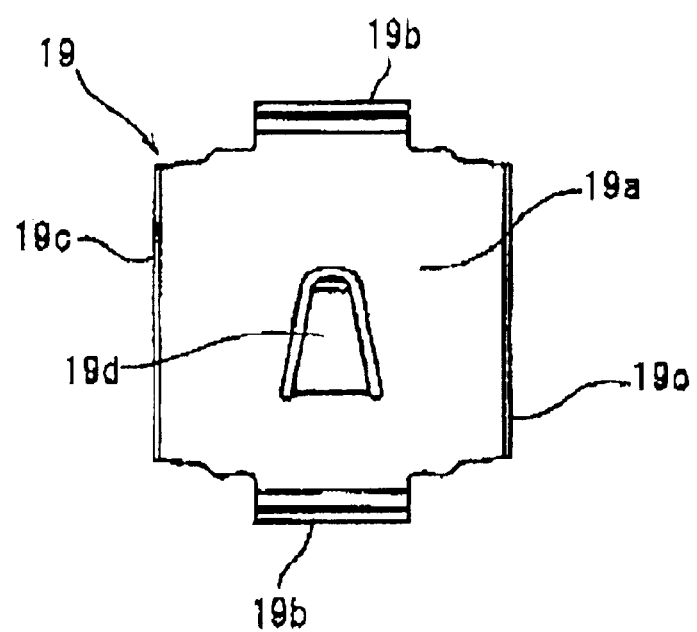
FIG. 3 is a front view of a structure of a pre-pressurizing spring as a flexible supporting member that is mounted on the PM type stepping motor indicated in FIG. 1.
Figure 4:
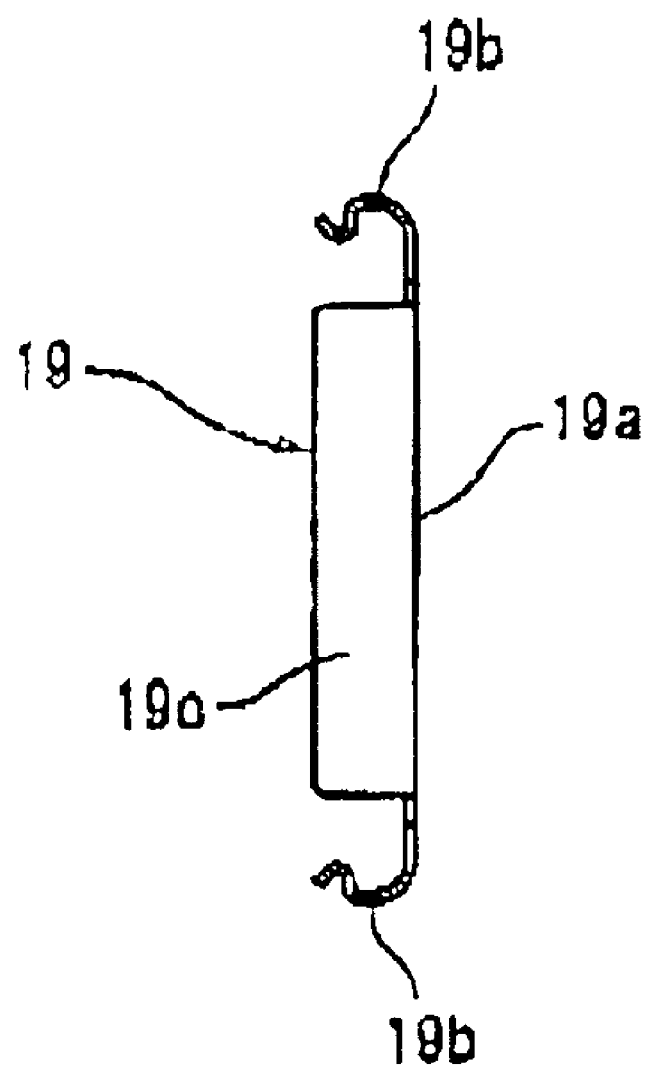
FIG. 4 shows a side view of the pre-pressurizing spring as a flexible supporting member shown in FIG. 3.
Figure 5:
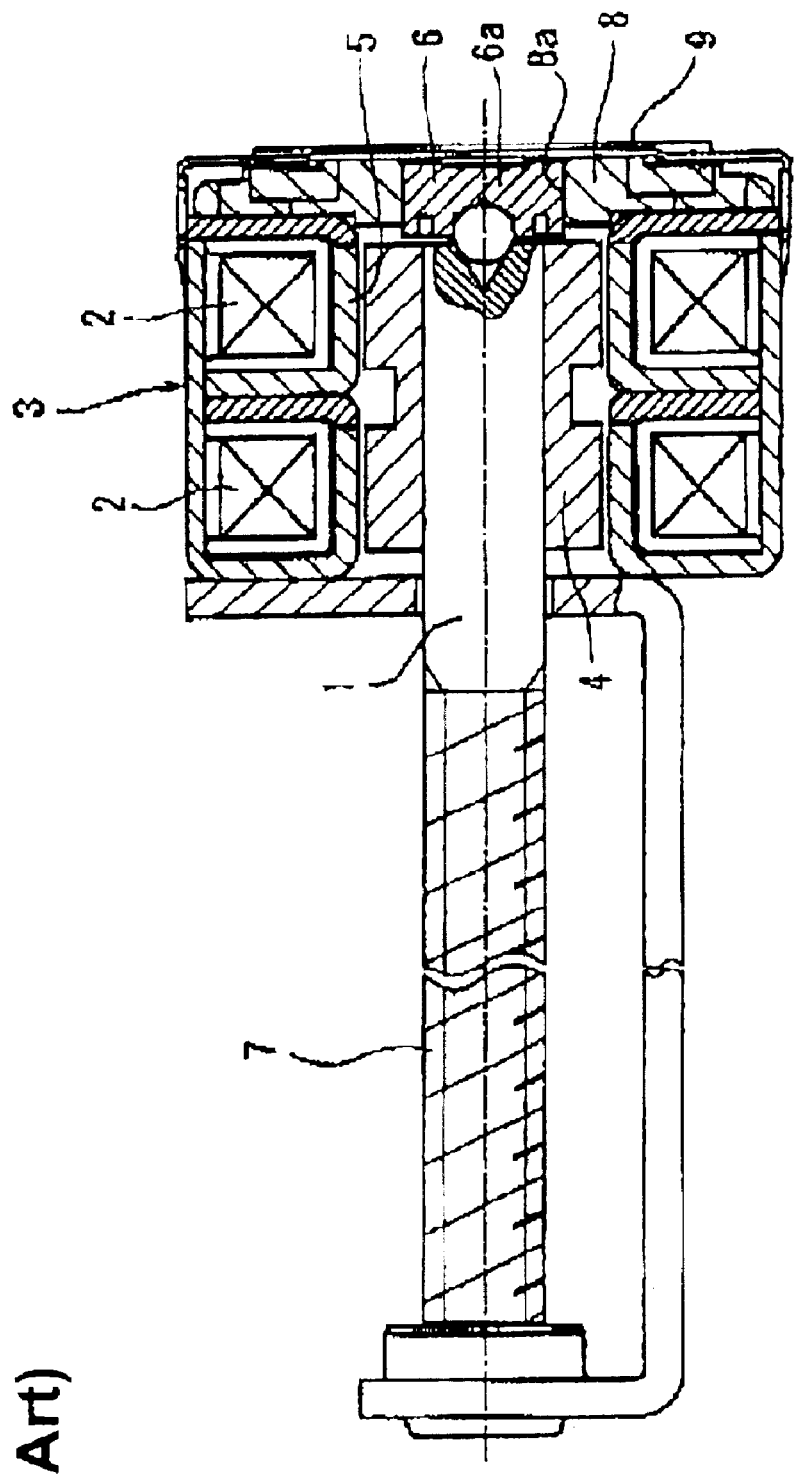
FIG. 5 is a vertical cross-sectional view of a structure of a conventional PM type stepping motor.
Figure 6:
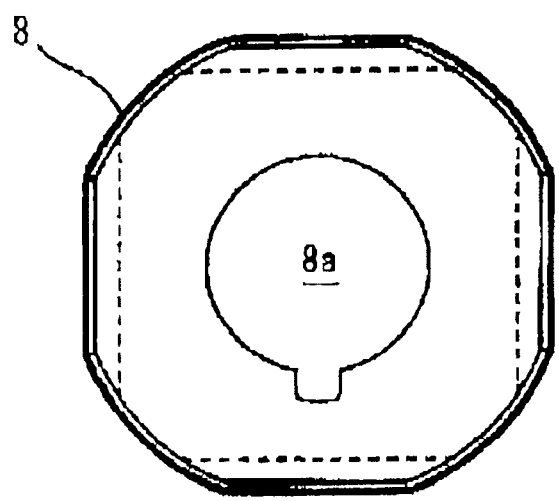
FIG. 6 is a front view of a bearing holder in one example that is mounted on the conventional PM type stepping motor indicated in FIG. 5.
Figure 7:
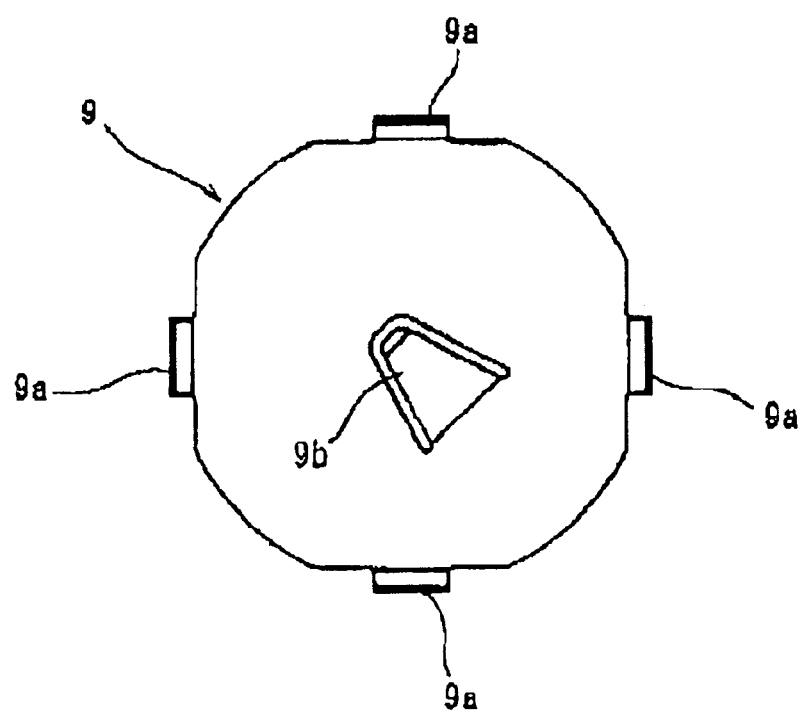
FIG. 7 is a front view of a structure of a pre-pressurizing spring as a flexible supporting member that is mounted on the conventional PM type stepping motor indicated in FIG. 6.
Figure 8:
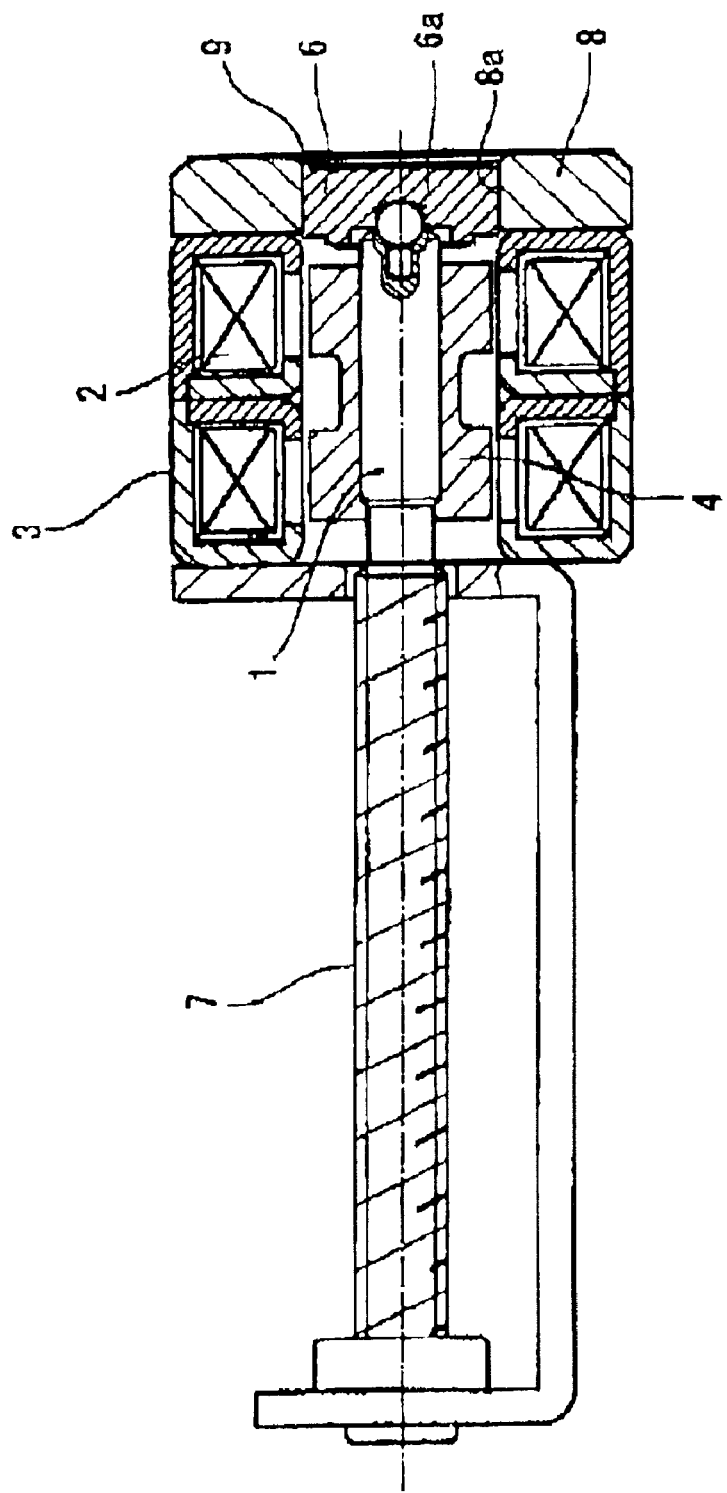
FIG. 8 is a vertical cross-sectional view of another example of a structure of a conventional PM type stepping motor.

Further, a pre-pressurizing spring 19, which is a flexible supporting member, is capped on an outer side (a right side in FIG. 1) of the bearing holder 18. The pre-pressurizing spring 19, which is a flexible supporting member, is formed from a plate-like flexible spring member shown, for example, in FIGS. 3 and 4. The pre-pressurizing spring 19 has a function to push the main body section 16a of the pivot bearing member 16 in the axial direction to restrict the position of the pivot bearing member 16.

The pre-pressurizing spring 19, which is a flexible supporting member, is equipped with a main flexible plate 19a that is formed in a plate shape, and a pair of hook-shaped mounting sections 19b at upper and lower end sections in the figure of the main flexible plate 19a. The mounting sections 19b are configured to engage the bearing holder 18. The two mounting sections 19b are provided opposing to each other in one (first) direction across the diameter of the motor, and inserted in and engage concave sections 18b of the bearing holder 18, whereby the entire pre-pressurizing spring 19 is affixed to the rear end side of the bearing holder 18.

Furthermore, a pair of reinforcing flange sections 19c are provided at right and left opposing edge sections (in the figure) of the main flexible plate 19a of the pre-pressurizing spring 19 that are provided opposing to each other in another (second) direction generally perpendicular to the first direction. The reinforcing flange sections 19c may be formed by bending end portions of the main flexible member 19a along the opposing sides thereof such that the reinforcing flange sections 19c sandwich the bearing holder 18. The reinforcing flange sections 19c are provided to enforce the rigidity of the main flexible plate 19a. The reinforcing flange sections 19c may also be formed to hold onto the opposing sides of the bearing holder 18 such that the reinforcing flange sections 19c function to prevent the entire pre-pressurizing spring 19 from falling off the bearing holder 18.

Furthermore, a section of the main flexible plate 19a of the pre-pressurizing spring 19 is cut out and bent to form a force-application spring section 19d. The force-application spring section 19d is provided generally in a central section of the main flexible plate 19a of the pre-pressurizing spring 19 at a location where the force-application spring section 19d abuts against a rear end face of the main body section 16a of the pivot bearing member 16. The force-application spring section 19d applies a flexible pressing force to the pivot bearing member 16 in the axial direction. By the axial pressing force caused by the force-application spring section 19d, the entire pivot bearing member 16 is pushed toward the rear end surface of the rotary shaft 11. As a result, the pivot bearing member 16 is positioned in the axial direction.

By the motor having the structure in accordance with the present embodiment described above, since the bearing holder 18 that holds the pivot bearing member 16 is formed from a sintered compact member, the bearing holder 18, which may have a complex structure, can be readily and highly accurately formed. In particular, the mounting hole 18a provided in the bearing holder 18 for retaining the pivot bearing member 16 has a highly accurate inner circumferential wall surface, such that the pivot bearing member 16 retained by the bearing holder 18 can be maintained in a good sliding state. As a consequence, the bearing member 16 can be readily and highly accurately positioned in the axial direction by the flexible pushing force in the axial direction cased by the force application spring section 19d.

Also, since the bearing holder 18 that holds the pivot bearing member 16 is formed from a sintered compact member, the bearing holder 18 may be affixed in position by welding. For example, in the embodiment described above, the bearing holder 18 may be affixed by welding to the retaining yokes 13a of the stator section that is disposed opposite the rotor section 14. This simplifies the fixing structure of the bearing holder 18, and reduce the overall size of the motor.

Furthermore, in accordance with the present embodiment, the pre-pressurizing spring 19 as a flexible supporting member that is attached to the bearing holder 18 has two mounting sections 19a. In other words, the number of the mounting sections 19a is reduced in half from four in the conventional art to two in the present embodiment. At the same time, the pair of reinforcing flange sections 19c are provided to maintain the rigidity of the pre-pressurizing spring 19. Accordingly, the pre-pressurizing spring 19 can be reduced in size, and also the bearing holder 18 can be reduced in size. It is noted that areas A indicated by hatching lines in FIG. 1 indicate regions that have been reduced in size compared to the conventional motor.

The present invention is described above referring to a particular embodiment. However, the present invention is not limited to the embodiment described above, and many modifications can be made without departing from the subject matter of the present invention.

The embodiment described above is an example in which the present invention is applied to a PM type stepping motor. However, the present invention is similarly applicable to other motors having a variety of structures other than stepping motors.

Also, in the embodiment described above, the present invention is applied to a inner rotor type motor. However, the present invention is also applicable in a similar manner to an outer rotor type motor.

As described above, since the bearing holder is formed from a sintered compact member, the bearing holder can be readily and highly accurately formed. Also, the bearing member retained by the bearing holder can be maintained in a good sliding state, such that the bearing member can be readily and highly accurately positioned in the axial direction. As a result, the bearing holder that retains the bearing member can be readily formed with a high precision and can be reduced in size, and therefore a reliable small-sized motor can be obtained at a low price.

In the motor described above, the bearing holder may be affixed by welding to the yoke of the stator section that is disposed opposite the rotor section. This simplifies the fixing structure of the bearing holder, and reduces the overall size of the motor. Accordingly, the effects described above can be further secured.

In accordance with another embodiment of the present invention, the bearing holder is provided with a flexible supporting member that applies a pressing force in the axial direction to the bearing member for restricting the position of the bearing member. The flexible supporting member has a reduced number of mounting sections that hold on to the bearing holder compared to the conventional structure, and a pair of reinforcing flange sections for maintaining the rigidity of the flexible supporting member. As a result, the flexible supporting member and the bearing holder can be reduced in size, such that the effects described above are further enforced.

In accordance with the embodiment described above, a separation between the two end sections of the bearing holder that are sandwiched by the two end portions of the flexible supporting member is formed shorter than a separation between the two opposing sides of the bearing holder at which the pair of mounting sections of the flexible supporting member are mounted. Accordingly, the bearing holder can be reduced in size and the effects described above can be further enforced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a rotor section including a rotor shaft having an end section;
   a bearing member that rotatably supports the end section of the rotor shaft;
   a bearing holder that moveably supports the bearing member in an axial direction, wherein the bearing holder is formed from a sintered compact member.

2. A motor according to claim 1, wherein the bearing holder is affixed by welding to a yoke of the stator section that is disposed opposite the rotor section.

3. A motor according to claim 1, further comprising a flexible supporting member mounted on the bearing holder to at least apply a pushing force to the bearing member in an axial direction to restrict position of the bearing member, wherein the flexible supporting member includes a pair of mounting sections provided at first opposing sides of the flexible supporting member in a first direction to engage the bearing holder, and a pair of reinforcing flange sections at second opposing sides of the flexible supporting member in a second direction generally perpendicular to the first direction.

4. A motor according to claim 3, wherein the flexible supporting member includes a main flexible section having a portion that comes in contact with an end section of the bearing member, and the pair of reinforcing flange sections are bent with respect to the main flexible section to sandwich two side edge sections of the bearing holder.

5. A motor according to claim 3, wherein a distance between two end sections of the bearing holder that are sandwiched by the flexible reinforcing members of the flexible supporting member is shorter than a distance between two opposing sides of the bearing holder at which the pair of mounting sections of the flexible supporting member are mounted.

6. A motor comprising:
   a rotor section including a rotor shaft having an end section;
   a stator section including a yoke section disposed opposite the rotor section, the stator section having an outer diameter;
   a bearing member having a main bearing section with a recess section and a ball bearing received in the recess section wherein the ball bearing rotatably support the end section of the rotor shaft;
   a bearing holder having a width at least in one direction shorter than the outer diameter of the stator section and defining a center through hole that slidably holds the main bearing section of the bearing member in the axial direction, wherein the bearing holder is formed from a sintered compact member.

7. A motor according to claim 6, wherein the sintered compact member is formed from sintered metal powders.

8. A motor according to claim 6, wherein the yoke section has at least one retaining yoke section extending in a radial direction and the bearing holder is affixed by welding to the at least one retaining yoke section of the yoke section of the stator section.

9. A motor according to claim 6, further comprising a flexible supporting member mounted on the bearing holder to at least apply a pushing force to the bearing member in an axial direction to restrict position of the bearing member, wherein the bearing member has outer surfaces defining a recessed section and the flexible supporting member includes a pair of bent mounting sections opposing each other in a first direction that engages the recessed section of the outer circumferential surface of the bearing member.

10. A motor according to claim 9, wherein the flexible supporting member includes a pair of reinforcing flange sections at opposing sides of the flexible supporting member in a second direction generally perpendicular to the first direction.

11. A motor according to claim 10, wherein the flexible supporting member includes a main flexible section having a portion that comes in contact with an end section of the bearing member, and the pair of reinforcing flange sections are bent with respect to the main flexible section to sandwich two side edge sections of the bearing holder.

12. A motor according to claim 10, wherein a distance between two end sections of the bearing holder that are sandwiched by the flexible reinforcing members of the flexible supporting member is shorter than a distance between two opposing sides of the bearing holder at which the pair of mounting sections of the flexible supporting member are mounted.

13. A bearing assembly for a motor including a rotor section with a rotor shaft having an end section, the bearing assembly comprising:
    a bearing member that rotatably supports the end section of the rotor shaft; and
    a bearing holder that moveably supports the bearing member in an axial direction, wherein the bearing holder is formed from a sintered compact member.

14. A bearing assembly according to claim 13, wherein the bearing holder is affixed by welding to a yoke of a stator section that is disposed opposite the rotor section.

15. A bearing assembly according to claim 13, further comprising a flexible supporting member mounted on the bearing holder to at least apply a pushing force to the bearing member in an axial direction to restrict position of the bearing member, wherein the flexible supporting member includes a pair of mounting sections provided at first opposing sides of the flexible supporting member in a first direction to engage the bearing holder, and a pair of reinforcing flange sections at second opposing sides of the flexible supporting member in a second direction generally perpendicular to the first direction.

16. A bearing assembly according to claim 15, wherein the flexible supporting member includes a main flexible section having a portion that comes in contact with an end section of the bearing member, and the pair of reinforcing flange sections are bent with respect to the main flexible section to sandwich two side edge sections of the bearing holder.

17. A bearing assembly according to claim 15, wherein a distance between two end sections of the bearing holder that are sandwiched by the flexible reinforcing members of the flexible supporting member is shorter than a distance between two opposing sides of the bearing holder at which the pair of mounting sections of the flexible supporting member are mounted.

18. A bearing assembly for a motor including a rotor section with a rotor shaft having an end section, a stator section including a yoke section disposed opposite the rotor section, the stator section having an outer diameter, the bearing assembly comprising;
   a bearing member having a main bearing section with a recess section and a ball bearing received in the recess section wherein the ball bearing rotatably support the end section of the rotor shaft;
   a bearing holder having a width at least in one direction shorter than the outer diameter of the stator section and defining a center through hole that slidably holds the main bearing section of the bearing member in the axial direction, wherein the bearing holder is formed from a sintered compact member.

19. A bearing assembly according to claim 18, wherein the sintered compact member is formed from sintered metal powders.

20. A bearing assembly according to claim 18, wherein the yoke section has at least one retaining yoke section extending in a radial direction and the bearing holder is affixed by welding to the at least one retaining yoke section of the yoke section of the stator section.

21. A bearing assembly according to claim 18, further comprising a flexible supporting member mounted on the bearing holder to at least apply a pushing force to the bearing member in an axial direction to restrict position of the bearing member, wherein the bearing member has outer surfaces defining a recessed section and the flexible supporting member includes a pair of bent mounting sections opposing each other in a first direction that engages the recessed section of the outer circumferential surface of the bearing member.

22. A bearing assembly according to claim 21, wherein the flexible supporting member includes a pair of reinforcing flange sections at opposing sides of the flexible supporting member in a second direction generally perpendicular to the first direction.

23. A bearing assembly according to claim 22, wherein the flexible supporting member includes a main flexible section having a portion that comes in contact with an end section of the bearing member, and the pair of reinforcing flange sections are bent with respect to the main flexible section to sandwich two side edge sections of the bearing holder.

24. A bearing assembly according to claim 22, wherein a distance between two end sections of the bearing holder that are sandwiched by the flexible reinforcing members of the flexible supporting member is shorter than a distance between two opposing sides of the bearing holder at which the pair of mounting sections of the flexible supporting member are mounted.

* * * * *